United States Patent [19]

DeChristopher

[11] Patent Number: 4,996,913
[45] Date of Patent: Mar. 5, 1991

[54] APPARATUS FOR HIGH PRODUCTION KNEADING OF PROOFED DOUGH BALLS

[76] Inventor: Eugene L. DeChristopher, 20 Ahlstrom La., Cotati, Calif. 94928

[21] Appl. No.: 425,467

[22] Filed: Oct. 23, 1989

[51] Int. Cl.$^5$ .............................................. A21C 11/00
[52] U.S. Cl. .................................... 99/450.1; 425/373
[58] Field of Search ...................... 99/450.1, 450.2, 353, 99/485; 425/364 R, 383, 392, 403; 366/69, 100

[56] References Cited

U.S. PATENT DOCUMENTS

| | | | |
|---|---|---|---|
| 2,735,379 | 2/1956 | Stiles | 425/373 X |
| 2,999,451 | 9/1961 | Buck et al. | 99/353 |
| 3,851,088 | 11/1974 | Albrecht et al. | 99/450.1 X |
| 4,388,060 | 6/1983 | Gugler | 425/373 X |
| 4,692,107 | 9/1987 | Morikawa et al. | 425/373 X |
| 4,692,110 | 9/1987 | Hayashi | 425/373 X |
| 4,815,859 | 3/1989 | Weinkle | 366/69 |
| 4,883,417 | 11/1989 | Morikawa et al. | 425/373 X |

FOREIGN PATENT DOCUMENTS 41231  7/1937  Netherlands ...................... 99/450.1

*Primary Examiner*—Harvey C. Hornsby
*Assistant Examiner*—Scott J. Haugland

[57] ABSTRACT

A kneading rocker for proofed dough balls has a convex, generally spherical, bottom surface to engage dough balls passing on a conveyor. A frame extends above the conveyor and a first carriage is mounted on the frame for reciprocal movement in one horizontal axis. A second carriage is mounted on the frame for reciprocal movement in the other horizontal axis and a stem extending upward from the dished spherical rocker is connected by a ball and socket joint to an impeller driven by both carriages. Hence, the upward end of the stem is moved both longitudinally and transversely to rock the spherical dish. Small spherical protrusions on the disk press "dimples" into a dough ball moving beneath it.

10 Claims, 2 Drawing Sheets

APPARATUS FOR HIGH PRODUCTION KNEADING OF PROOFED DOUGH BALLS

BACKGROUND OF THE INVENTION

Traditionally, pizza shells heve been formed by pressing, kneading and stretching a ball of proofed dough by hand into a relatively thin shell with a relatively thick rim. Generally, efforts to automate this process of kneading dough for pizza shells have not been successful in that mechanisms involved have not been able to simulate the manipulations of the human fingers. Some automated devices simply flatten and squeeze the dough between a pair of rollers, which are in the nature of a washing machine wringer. Any gas pockets in the dough tend to be flattened and ruptured and the pizza shell is not light and fluffy but, instead, flat and unappetizing. A hand operated roller configured to simulate hand kneading and shaping of a pizza shell has been disclosed in U.S. Pat. No. 4,815,859 for "Roller For Making Pizza Shell". The roller illustrated and described therein has a plurality of rounded knobs, which are spaced in annular rows, and the roller has to be rolled back and forth over the dough in order to cover the complete surface thereof. Moreover, the roller is designed to knead manually a single pizza shell, and is not adapted for mass production.

OBJECTS OF THE INVENTION

It is an object of this invention to provide apparatus for high production kneading of proofed dough balls.

It is a further object of this invention to provide means for producing pizza shells on a production basis without flattening and squeezing all of the gas out of the dough.

It is a further object of this invention to provide apparatus for high production of pizza shells which simulates the workings of the human fingers in pressing spaced dimples into the dough.

It is a further object of this invention to provide apparatus for production kneading of proofed dough balls wherein each dough ball may be passed through a series of pressing devices which work the dough in simulation of human manipulation.

Other objects and advantages of this invention will become apparent from the description to follow, particularly when read in conjunction with the accompanying drawings.

SUMMARY OF THE INVENTION

In the apparatus of this invention, dough balls are carried by a conveyor under a plurality of rocking devices with generally spherical bottom surfaces having clustered, spherical knobs thereon. Each rocking device has an upright stem, which is connected in a ball and socket joint to an impeller. A plurality of such impellers are mounted swiveled simultaneously to two carriages that move along both horizontal axes. The impellers are thus moved around in near circular paths to roll the knobbed, spherical surfaces over the dough, making generally spherical indentations therein, as would occur if manipulated by human fingers. As a result, the dough balls are pressed into pizza shells of reduced thickness with a smooth, but irregular, dimpled surface in which pockets of gas remain for expansion during the baking process.

DESCRIPTION OF A PREFERRED EMBODIMENT

Figure 1:
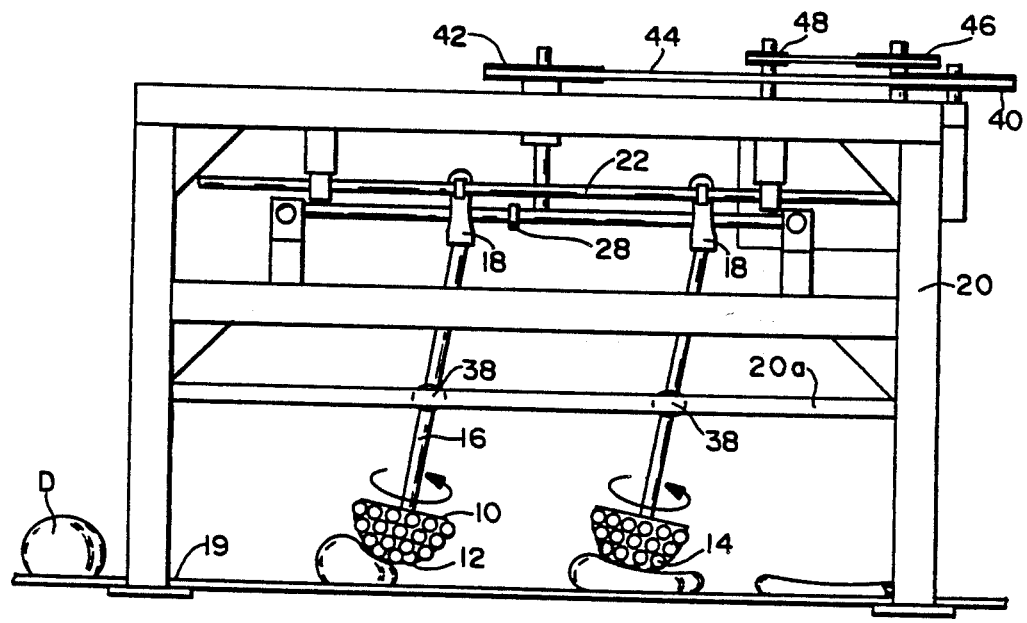
FIG. 1 is an elevetion view of the apparatus of this invention for high-production kneading of proofed dough balls.
Figure 2:
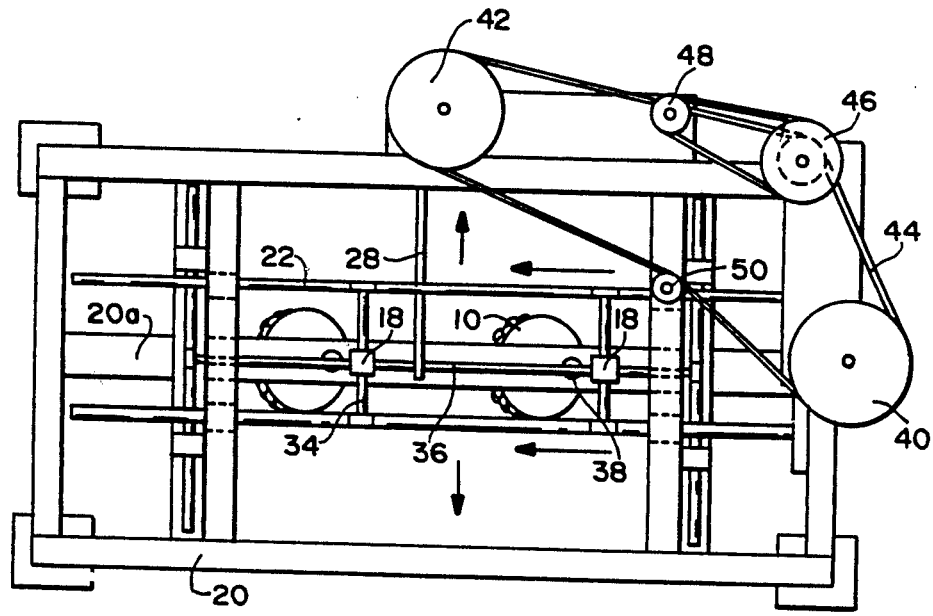
FIG. 2 is a top plan view of the apparatus.
Figure 3:
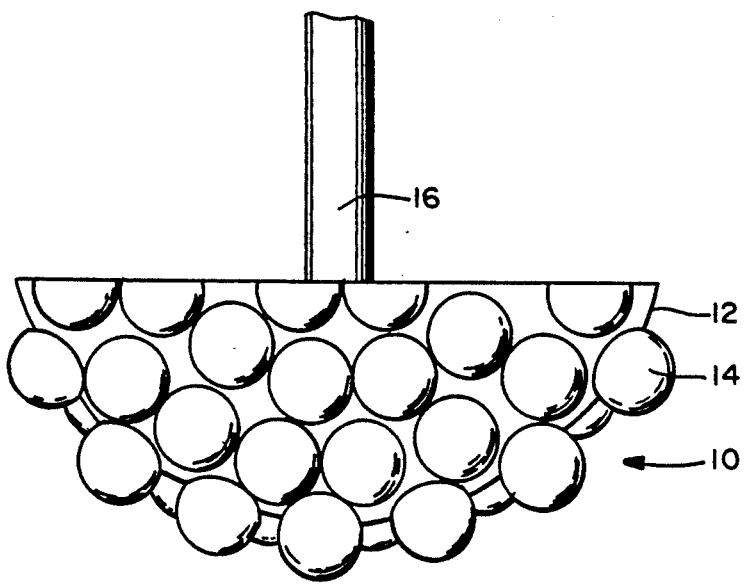
FIG. 3 is an enlarged view of the dough pressing and kneading component of the apparatus.

Referring now to FIGS. 1 and 3 with greater particularity, each kneading rocker 10 of this invention has a generally spherical under surface 12, with a multiplicity of spherical projections or knobs 14, at least some of which are at least hemispheres, arranged in closely nested relationship over its surface. The spherical rocker 10 is mounted on an upright stem 16, which is swiveled in a ball and socket joint to an impeller member 18, mounted on a frame 20. As desired, there may be several impellers 18 arranged longitudinally of the frame and several arranged across the width of the frame for mass production kneading and working of dough balls D as they move along the conveyor 19.

Figure 4:
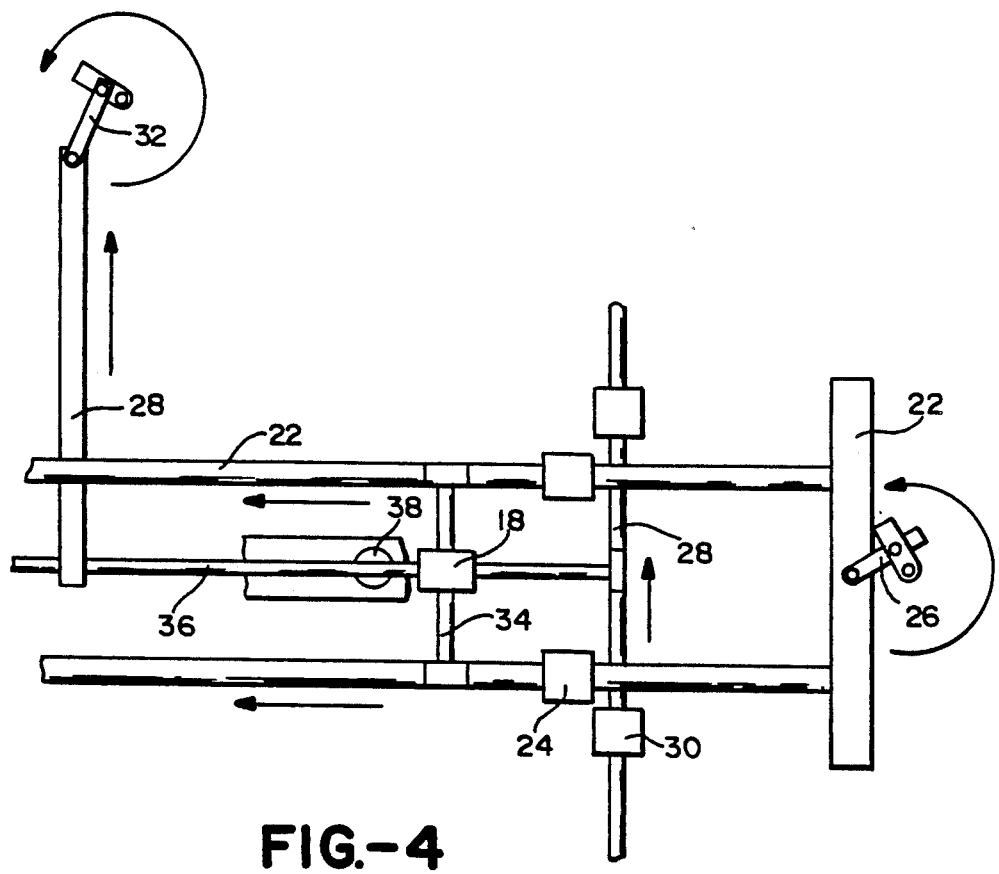
FIG. 4 is a partial view showing the drive mechanism of the apparatus.

Movable longitudinally on the frame 20 is a first or upper carriage 22, which is mounted for reciprocation in slide bearing 24 (FIG. 4), as by means of a rotating crank 26. Movable transversely across the frame 20 is a second or lower carriage 28, which is reciprocated in slide bearings 30 by means of a second or lower rotating crank 32. The longitudinal carriage or slide 22 carries a cross rod 34 on which is slidably carried the previously mentioned impeller 18. The transverse carriage or slide 28 carries a longitudinal rod 36 that slides through an impeller 18. Hence, as the longitudinal carriage 22 reciprocates lengthwise of the conveyor belt, each cross rod will carry an impeller 18 with it, and as the lower carriage reciprocates across of the conveyor 19, the rod 36 will carry the impeller 18 transversely. These movements of the impellers 18 will pivot the stems or rods 16 in ball and socket joints 38, which are carried in a member 20a on the frame 20.

The simultaneous reciprocation of the longitudinal and transverse carriages 22 and 28 carry the impellers 18 in a generally circular path to roll and rock the knobbed hemispherical heads 10 along and acrosss the conveyor 19 and the dough balls D. The cranks 26 and 32 that reciprocate the carriages are rotated with pulleys or sprockets 40 and 42, which are driven by a chain or belt 44 from drive sprocket 46. The drive sprocket 46 is driven by the drive sprocket 48 on a suitable motor (not shown). An idler pulley 50 rotated on the frame 20 maintains the drive belt under tension.

While this invention has been described in conjunction with a preferred embodiment thereof, it is obvious that modifications and changes therein may be made by those skilled in the art to which it pertains without departing from the spirit and scope of this invention, as defined by claims appended hereto.

What is claimed as invention is:

1. Apparatus for high production kneading of dough balls comprising:
    a conveyor belt;
    a kneading rocker having bottom surface portions defining a portion of a sphere positioned to engage objects traveling on said conveyor belt;

an upright stem secured to said rocker and extending upward therefrom;

an impeller mounted for horizontal, reciprocal movement, both transversely and longitudinally of said conveyor belt; and a swivel connection between said impeller and the upper end of said stem to rock said kneading rocker both transversely and longitudinally of said conveyor belt by reciprocal movement of said impeller.

2. The apparatus defined by claim 1 wherein:

said swivel connection is a ball and socket joint.

3. The apparatus defined by claim 1 including:

a frame mounted above said conveyor belt;

a first carriage mounted on said frame for movement along a first horizontal path generally longitudinally of said conveyor belt;

a second carriage mounted on said frame for reciprocal movement along a second horizontal path transversely of said conveyor belt;

said impeller being sidably carried on both said carriages to move with one said carriage while moving along the other said carriage.

4. The apparatus defined by claim 3 including:

a plurality of protrusions defining said portion of a sphere.

5. the apparatus defined by claim 4 wherein;

said protrusions are spherical and at least some of said protrusions are at least hemispheres.

6. The apparatus defined by claim 3 including:

a second swivel joint mounted on said frame and receiving said stem intermediate the ends thereof.

7. Apparatus for the high production kneading of dough balls comprising:

a conveyor belt;

a frame mounted above said conveyor belt;

a first carriage mounted on said frame for movement along a first horizontal path generally longitudinally of said conveyor belt;

a second carriage mounted on said frame for reciprocal movement along a second horizontal path transversely of said conveyor belt;

at least two impellers, each impeller being slidably carried on both said carriages to move with one said carriage while moving along the other said carriage;

a stem connected by a ball and socket joint to each said impeller;

a kneading rocker having bottom surface portions defining a portion of a sphere carried on the lower end of each said stem.

8. The apparatus defined by claim 7 including:

a plurality of protrusions defining said portion of a sphere.

9. The apparatus defined by claim 8 wherein;

said protrusions are spherical and at least some of said protrusions are at least hemispheres.

10. The apparatus defined by claim 7 including:

a second swivel joint mounted on said frame and receiving each said stem intermediate the ends thereof.

* * * * *